United States Patent
Shiraishi et al.

(10) Patent No.: US 9,267,008 B2
(45) Date of Patent: Feb. 23, 2016

(54) HEAT-SHRINKABLE WHITE FILM

(75) Inventors: Akihiko Shiraishi, Moriyama (JP); Masahiro Watanabe, Niimi (JP)

(73) Assignee: C.I. KASEI COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/387,689

(22) PCT Filed: Mar. 27, 2012

(86) PCT No.: PCT/JP2012/057865
§ 371 (c)(1),
(2), (4) Date: Sep. 24, 2014

(87) PCT Pub. No.: WO2013/145115
PCT Pub. Date: Oct. 3, 2013

(65) Prior Publication Data
US 2015/0018489 A1    Jan. 15, 2015

(51) Int. Cl.
*C08J 5/18*    (2006.01)
*B29C 61/00*   (2006.01)
*B29K 67/00*   (2006.01)

(52) U.S. Cl.
CPC ............... *C08J 5/18* (2013.01); *B29C 61/003* (2013.01); *B29K 2067/003* (2013.01); *C08J 2367/02* (2013.01); *C08J 2423/20* (2013.01); *C08J 2457/00* (2013.01); *C08J 2467/00* (2013.01); *C08J 2467/02* (2013.01)

(58) Field of Classification Search
CPC ...... C08J 5/18; C08J 2457/00; C08J 2467/00; C08J 2467/02; C08J 2367/02; C08J 2423/20; B29C 61/003; B29K 2067/003
See application file for complete search history.

(56) References Cited

U.S. PATENT DOCUMENTS

2010/0209694 A1*  8/2010  Aoyama et al. ............ 428/317.9

FOREIGN PATENT DOCUMENTS

| EP | 1227119 A2 | 7/2002 |
|---|---|---|
| EP | 2441582 A1 | 4/2012 |
| JP | A-2001-247688 | 9/2001 |
| JP | A-2002-249564 | 9/2002 |
| JP | A-2003-175579 | 6/2003 |
| JP | A-2003-213103 | 7/2003 |
| JP | A-2003-340922 | 12/2003 |
| JP | A-2004-155482 | 6/2004 |
| JP | A-2005-047959 | 2/2005 |
| JP | A-2005-212226 | 8/2005 |
| JP | A-2006-063134 | 3/2006 |
| JP | A-2009-132813 | 6/2009 |
| JP | A-2010-047006 | 3/2010 |
| JP | A-2010-264644 | 11/2010 |
| JP | B-5410403 | 2/2014 |
| WO | WO 2008/149757 A1 | 12/2008 |
| WO | WO 2010/143737 A1 | 12/2010 |

OTHER PUBLICATIONS

International Search Report in PCT/JP2012/057865, mailed Jun. 12, 2012.
Notification (Information Statement) in Japanese Patent Application No. 2010-262598 mailed Oct. 16, 2012.
Office Action in Japanese Patent Application No. 2010-262598, mailed Apr. 16, 2013.
Notification (Information Statement) in Japanese Patent Application No. 2013-206116, mailed May 20, 2014.
Extended European search report in European Patent Application No. 12872791.4, dated Nov. 10, 2015.

* cited by examiner

*Primary Examiner* — Robert Jones, Jr.
(74) *Attorney, Agent, or Firm* — Knobbe Martens Olson & Bear LLP

(57) ABSTRACT

A heat-shrinkable white film including an amorphous polyethylene terephthalate; a cyclic olefin resin having a glass transition temperature of 100° C. or higher; and a polyester elastomer having a Vicat softening point of 150° C. or lower.

1 Claim, No Drawings

HEAT-SHRINKABLE WHITE FILM

This application is the U.S. National Phase under 35 U.S.C. §371 of International Application No. PCT/JP2012/057865, filed Mar. 27, 2012, designating the U.S., and published in Japanese as WO 2013/145115 on Mar. 10, 2013, the entire contents of which are incorporated herein by reference.

TECHNICAL FIELD

The present invention relates to a heat-shrinkable white film.

BACKGROUND ART

In general, a label formed of a heat-shrinkable film subjected to printing is mounted on a beverage or seasoning bottle.

Most heat-shrinkable films which have been used in the past are transparent. However, white heat-shrinkable films are required from the viewpoint of diversification of designs. As a method of whitening a heat-shrinkable film, a method of containing an inorganic white pigment such as titanium oxide and a coating method using a white ink are proposed (for example, Patent Document 1 and 2).

CITATION LIST

Patent Document

[Patent Document 1] Japanese Unexamined Patent Application, First Publication No. 2004-155482

[Patent Document 2] Japanese Unexamined Patent Application, First Publication No. 2005-212226

SUMMARY OF INVENTION

Technical Problem

However, it is difficult to uniformly disperse an inorganic white pigment in a resin film. As a result, problems such as classification and an increase in specific gravity of the film occur. In addition, the coating method using a white ink is not easily performed.

Moreover, when a label looks unattractive, a product having the label mounted thereon also gives a bad impression. Therefore, heat-shrinkable films are required to have high surface smoothness in order to improve the appearance of the label and to prevent print omission.

An object of the invention is to provide a heat-shrinkable white film which has heat shrinkability, high concealability, and high surface smoothness, and is white and simple to obtain.

Solution to Problem

The invention has the following aspect.

A heat-shrinkable white film according to an aspect of the invention contains an amorphous polyethylene terephthalate; a cyclic olefin resin having a glass transition temperature of 100° C. or higher; and a polyester elastomer having a Vicat softening point of 150° C. or lower.

Effects of Invention

A heat-shrinkable white film having the above-described aspect has heat shrinkability, high concealability, and high surface smoothness, and is white and simple to obtain.

DESCRIPTION OF EMBODIMENTS

A heat-shrinkable white film according to an embodiment of the invention contains an amorphous polyethylene terephthalate, a cyclic olefin resin, and a polyester elastomer.

(Amorphous Polyethylene Terephthalate)

The amorphous polyethylene terephthalate is a polyester having a crystallinity degree of less than 5%. The crystallinity degree of the amorphous polyethylene terephthalate is preferably 3% or less, more preferably 1% or less, and particularly preferably 0%. The crystallinity degree is obtained from a result of X-ray diffraction measurement. When the crystallinity degree of the amorphous polyethylene terephthalate is equal to or greater than the upper limit value, heat shrinkability is reduced.

Examples of the amorphous polyethylene terephthalate include a polyester composed of a dicarboxylic acid component consisting of terephthalic acid and a diol component consisting of 20 to 35 mol % of 1,4-cyclohexanedimethanol and 65 to 80 mol % of ethylene glycol.

Examples of commercially available amorphous polyethylene terephthalates include "PETG GN071", "PETG 6763", and "Provista" manufactured by Eastman Chemical Company.

The ratio of the amorphous polyethylene terephthalate contained in the heat-shrinkable white film is preferably 50 to 80 mass %, and more preferably 60 to 70 mass % when a total of the amorphous polyethylene terephthalate, the cyclic olefin resin, and the polyester elastomer is set to 100 mass %. When the ratio of the amorphous polyethylene terephthalate contained is equal to or greater than the lower limit value, the film has increased heat shrinkability, and when the ratio of the amorphous polyethylene terephthalate contained is equal to or less than the upper limit value, the cyclic olefin resin can be sufficiently contained. As a result, the concealability of the heat-shrinkable white film can be increased.

(Cyclic Olefin Resin)

The cyclic olefin resin is a polymer having at least a norbornene monomer unit.

The norbornene monomer has a norbornene skeleton in its molecular skeleton, and examples of the norbornene monomer include dicyclopentadiene, norbornene, and tetracyclododecene. These may be used singly or in combination of two or more kinds.

The cyclic olefin resin may be a copolymer having an ethylene monomer unit. In the case of the copolymer, a ratio of the norbornene monomer unit is preferably 65 to 80 mass %. When the ratio of the norbornene monomer unit is 65 mass % or more, the film can be easily whitened, and when the ratio of the norbornene monomer unit is 80 mass % or less, the heat shrinkability of the film can be increased.

Commercially available cyclic olefin resins include "Zeonor (registered trade name)" manufactured by Nippon Zeon Corp., "TOPAS (registered trade name)" manufactured by Topas Advanced Polymers Inc., and "Apel (registered trade name)" manufactured by Mitsui Chemicals Inc.

The glass transition temperature of the cyclic olefin resin is preferably 100° C. or higher, and more preferably 105° C. or higher. The glass transition temperature is a value measured according to ISO11357-1, ISO11357-2, and ISO11357-3 (international standards). When the glass transition temperature of the cyclic olefin resin is lower than the upper lower limit value, the concealability of the film is damaged.

The glass transition temperature of the cyclic olefin resin is preferably 150° C. or lower so that the obtained film can be easily stretched and the heat shrinkability can be increased.

The ratio of the cyclic olefin resin contained in the heat-shrinkable white film is preferably 10 to 40 mass %, and more preferably 20 to 30 mass % when a total of the amorphous polyethylene terephthalate, the cyclic olefin resin, and the polyester elastomer is set to 100 mass %. When the ratio of the cyclic olefin resin contained is equal to or greater than the lower limit value, the film has sufficiently increased concealability, and when the ratio of the cyclic olefin resin contained is equal to or less than the upper limit value, the film has increased heat shrinkability.

(Polyester Elastomer)

The polyester elastomer is a copolymer composed of a hard segment consisting of crystalline polyester and a soft segment consisting of polyether or polyester.

Examples of the hard segment include polybutylene terephthalate and polybutylene naphthalate.

Examples of the soft segment include polytetramethylene diglycol, polypropylene glycol, polyethylene glycol, and aliphatic polyester.

The Vicat softening point of the polyester elastomer is 150° C. or lower, preferably 140° C. or lower, and more preferably 130° C. or lower. The Vicat softening point is a value measured according to JIS K7206 (Japanese industrial standards). When the Vicat softening point of the polyester elastomer is higher than the lower upper limit value, the film has insufficient heat shrinkability.

The Vicat softening point of the polyester elastomer is preferably 100° C. or higher in order to provide a polyester elastomer having useful mechanical properties.

The Vicat softening point of the polyester elastomer can be adjusted using a molar ratio between the hard segment and the soft segment. The higher the molar ratio of the soft segment, the lower the Vicat softening point.

The ratio of the polyester elastomer contained in the heat-shrinkable white film is preferably 2 to 20 mass %, and more preferably 5 to 15 mass % when a total of the amorphous polyethylene terephthalate, the cyclic olefin resin, and the polyester elastomer is set to 100 mass %. When the ratio of the polyester elastomer contained in the heat-shrinkable white film is equal to or greater than the lower limit value, the film has increased heat shrinkability, and when the ratio of the polyester elastomer contained in the heat-shrinkable white film is equal to or less than the upper limit value, the cyclic olefin resin can be sufficiently contained. As a result, the concealability of the film can be increased.

Other Components

If necessary, the heat-shrinkable white film may contain, other than the above-described polymers, other polymers such as a crystalline polyethylene terephthalate having a crystallinity degree of 5% or greater, a polybutylene terephthalate, and an acrylic graft copolymer.

The heat-shrinkable white film may further contain additives such as a filler, a stabilizer, an antioxidant, an ultraviolet absorber, an antistatic agent, a lubricant, and a coloring agent.

(Physical Properties of Heat-Shrinkable White Film)

The heat shrinkage factor of the heat-shrinkable white film of the invention when heated for 10 seconds at 90° C. is preferably 50% or greater, more preferably 55% or greater, and even more preferably 60% or greater. When the heat shrinkage factor of the heat-shrinkable white film is equal to or greater than the lower limit value, a film having sufficient heat shrinkability is obtained.

The natural shrinkage factor of the heat-shrinkable white film in a main stretching direction when left for 7 days at 40° C. is preferably 2% or less. When the natural shrinkage factor of the heat-shrinkable white film is equal to or less than the upper limit value, the heat-shrinkable white film during storage rarely shrinks, and thus wrinkles and dimensional variations rarely occur in the heat-shrinkable white film.

The haze of the heat-shrinkable white film is preferably 90% or greater, more preferably 95% or greater, and even more preferably 98% or greater. When the haze of the heat-shrinkable white film is equal to or greater than the lower limit vale, a film having sufficient concealability is obtained.

The thickness of the heat-shrinkable film 10 is preferably 20 to 100 μm, and more preferably 40 to 80 μm. When the thickness of the heat-shrinkable film is equal to or greater than the lower limit value, the film can secure a sufficient tensile strength, and when the thickness of the heat-shrinkable film is equal to or less than the upper limit value, the heat-shrinkable white film can be easily manufactured.

(Usage Example)

The heat-shrinkable white film is used mainly as a label of a bottle main body. When it is used as a label, the heat-shrinkable white film may be subjected to printing in order to improve a design.

Examples of the method of mounting a label formed of the heat-shrinkable white film on a bottle main body include a method including: cutting the heat-shrinkable white film to have a predetermined length; bonding end portions of the cut film to provide a cylindrical body; inserting the bottle main body into the cylindrical body; and performing heating for shrinking.

The heating temperature when shrinking the heat-shrinkable white film is preferably 50 to 100° C. When the heating temperature is equal to or higher than the lower limit value, the heat-shrinkable film is easily shrunk, and when the heating temperature is equal to or lower than the upper limit value, the melting of the heat-shrinkable white film can be prevented.

(Manufacturing Method)

The heat-shrinkable white film of the invention can be manufactured using the following manufacturing method.

First, a mixture is obtained by mixing the above-described amorphous polyethylene terephthalate, cyclic olefin resin, and polyester elastomer. Thereafter, the mixture is molded using a T-die method or an inflation method to produce a film raw material. Next, the film raw material is heated at 80 to 100° C. and stretched preferably 3 to 10 times, and more preferably 4 to 6 times in a main stretching direction (in general, a width direction (transverse direction) of the film raw material) to obtain a heat-shrinkable white film. If necessary, the heat-shrinkable film may be wound by being subjected to annealing.

Actions and Effects

In the above-described heat-shrinkable white film, the amorphous polyethylene terephthalate and the polyester elastomer are contained, and thus a film having high heat shrinkability is obtained. In addition, the cyclic olefin resin is not compatibilized with the amorphous polyethylene terephthalate and the polyester elastomer and fine particles are made. A gap is formed between interfaces of the fine particles. Therefore, the film has an increased light-scattering property. Accordingly, the concealability of the film is increased in order to whiten the film. Furthermore, since there is no need to perform whitening through coating with an ink, the heat-shrinkable white film is easily obtained.

The heat-shrinkable white film containing the amorphous polyethylene terephthalate, the cyclic olefin resin, and the polyester elastomer rarely has a rough surface. That is, the film has high surface smoothness.

EXAMPLES

The following resins were used in the following examples and comparative examples.

Amorphous Polyethylene Terephtalate (amorphous PET): GN071 manufactured by Eastman Chemical Company (glass transition temperature: 80° C.)

Cyclic Olefin Resin-1: Apel 6011T manufactured by Mitsui Chemicals Inc. (glass transition temperature: 105° C.)

Cyclic Olefin Resin-2: TOPAS9567 manufactured by Topas Advanced Polymers Inc. (glass transition temperature: 65° C.)

Polyester Elastomer-1: Hytrel 3046 manufactured by DuPont-Toray Co., Ltd. (glass transition temperature: −69° C., melting point: 160° C., Vicat softening point: 74° C.)

Polyester Elastomer-2: Hytrel 4047 manufactured by DuPont-Toray Co., Ltd. (glass transition temperature: −40° C., melting point: 199° C., Vicat softening point: 127° C.)

Polyester Elastomer-3: Hytrel 7247 manufactured by DuPont-Toray Co., Ltd. (glass transition temperature: 12° C., melting point: 216° C., Vicat softening point: 208° C.)

Other Elastomer: Hybrar KL7350 manufactured by Kuraray Co., Ltd. (glass transition temperature: −22° C., styrene elastomer)

Examples 1 and 2 and Comparative Examples 1 to 3

A mixture was obtained by mixing resins based on the mixing shown in Table 1. Thereafter, the mixture was molded into a film using a T-die method, and thus a film raw material having a thickness of 200 μm was obtained. Thereafter, the film raw material was heated at 85° C. and stretched 4 times in a main stretching direction (width direction) to obtain a heat-shrinkable film. The thickness of each heat-shrinkable film is shown in Table 1.

TABLE 1

|  |  | Examples | | Comparative Examples | | |
| --- | --- | --- | --- | --- | --- | --- |
|  |  | 1 | 2 | 1 | 2 | 3 |
| Amorphous PET | mass % |  |  | 60 |  |  |
| Cyclic Olefin Copolymer-1 | mass % |  | 30 |  |  |  |
| Cyclic Olefin Copolymer-2 | mass % | — | — | — | — | 30 |
| Polyester Elastomer-1 | mass % | 10 | — | — | — | — |
| Polyester Elastomer-2 | mass % | — | 10 | — | — | — |
| Polyester Elastomer-3 | mass % | — | — | — | 10 | 10 |
| Other Elastomer | mass % | — | — | 10 | — | — |
| Film Thickness | μm | 47 | 68 | 72 | 65 | 63 |
| Heat Shrinkability | 60° C. % | 0.5 | 0.5 | 0.5 | 1.0 | 0.5 |
|  | 70° C. % | 21.0 | 16.5 | 21.5 | 11.5 | 25.0 |
|  | 80° C. % | 49.0 | 41.0 | 51.5 | 24.5 | 49.0 |
|  | 90° C. % | 59.0 | 55.5 | 62.5 | 34.5 | 58.5 |
|  | 100° C. % | 63.0 | 59.0 | 67.5 | 45.0 | 62.5 |
| Haze | % | 97.9 | 98.7 | 98.7 | 98.0 | 48.9 |
| Total Light Transmittance | % | 73.0 | 36.9 | 22.4 | 79.6 | 92.2 |
| Surface Smoothness | — | Good | Good | Not Good | Good | Good |
| Natural Shrinkage Factor | After 1 day % | 0.13 | 0.17 | 0.20 | 0.30 | 0.33 |
|  | After 5 days % | 0.30 | 0.27 | 0.30 | 0.43 | 0.45 |
|  | After 7 days % | 0.37 | 0.33 | 0.33 | 0.50 | 0.50 |

A heat shrinkage factor, concealability (haze, total light transmittance), surface smoothness, and a natural shrinkage factor of the obtained heat-shrinkable film were measured using the following methods.

(Heat Shrinkage Factor)

Marked lines were drawn at an interval of 100 mm in the main stretching direction of the heat-shrinkable film, and the film was held for 10 seconds in warm water having a predetermined temperature (60° C., 70° C., 80° C., 90° C., 100° C.). Then, cooling was promptly performed in cold water. A length between the marked lines after the cooling was measured and a heat shrinkage factor of the heat-shrinkable film was obtained using the following Expression (1).

[Exp. 1]

$$\text{Heat Shrinkage Factor (\%)} = \{[(100) - (\text{a length (mm) between marked lines after holding for 10 seconds in warm water})]/(100)\} \times 100 \quad (1)$$

(Haze, Total Light Transmittance)

The haze and the total light transmittance of the heat-shrinkable film were measured according to JIS K7105 (Japanese industrial standards). The higher the haze and the lower the total light transmittance, the higher the concealability of the heat-shrinkable film.

(Surface Smoothness)

The surface smoothness of the heat-shrinkable film was visually evaluated by the following standards.

Good: Irregularities are not shown on the surface of the heat-shrinkable film.

Not Good: Irregularities are shown on the surface of the heat-shrinkable film.

(Natural Shrinkage Factor)

Marked lines were drawn at an interval of 100 mm in the main stretching direction of the heat-shrinkable film, and the film was left for 7 days at 40° C. Thereafter, a length between the marked lines of the heat-shrinkable film was measured and a natural shrinkage factor was obtained using the following Expression (2).

[Exp. 2]

$$\text{Natural Shrinkage Factor (\%)} = \{[(100) - (\text{a length (mm) between marked lines after leaving of film for 7 days at 40° C.})]/(100)\} \times 100 \quad (2)$$

The heat-shrinkable white films of Examples 1 and 2 containing an amorphous polyethylene terephthalate, a cyclic olefin resin having a glass transition temperature of 100° C. or higher, and a polyester elastomer having a Vicat softening point of 150° C. or lower had sufficiently high heat shrinkability and concealability. These also had high surface smoothness.

In contrast, the heat-shrinkable film of Comparative Example 1 using a styrene elastomer in place of the polyester elastomer had low surface smoothness.

The heat-shrinkable film of Comparative Example 2 using a polyester elastomer having a Vicat softening point of higher than 150° C. in place of the polyester elastomer having a Vicat softening point of 150° C. or lower had insufficient heat shrinkability.

The heat-shrinkable film of Comparative Example 3 using a cyclic olefin resin having a glass transition temperature of lower than 100° C. in place of the cyclic olefin resin having a glass transition temperature of 100° C. or higher and using a polyester elastomer having a Vicat softening point of higher than 150° C. in place of the polyester elastomer having a Vicat softening point of 150° C. or lower had insufficient concealability.

INDUSTRIAL APPLICABILITY

According to the invention, it is possible to easily obtain a heat-shrinkable white film which has heat shrinkability, high concealability, and high surface smoothness.

The invention claimed is:
1. A heat-shrinkable white film comprising:
an amorphous polyethylene terephthalate;
a cyclic olefin resin having a glass transition temperature of 100° C. to 150° C.; and
a polyester elastomer having a Vicat softening point of 150° C. or lower,
wherein said white film shrinks at a temperature of 50° C. to 100° C.

* * * * *